(12) United States Patent
Thorsen et al.

(10) Patent No.: US 9,282,508 B2
(45) Date of Patent: Mar. 8, 2016

(54) RATE OPTIMIZED POWER CONSUMPTION IN MICRO WAVE RADIO LINKS

(75) Inventors: Per-Arne Thorsen, Ojersjo (SE);
Robert Lindgren, Vastra Frolunda (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 221 days.

(21) Appl. No.: 13/977,334

(22) PCT Filed: Dec. 29, 2010

(86) PCT No.: PCT/EP2010/070869
§ 371 (c)(1),
(2), (4) Date: Jun. 28, 2013

(87) PCT Pub. No.: WO2012/089252
PCT Pub. Date: Jul. 5, 2012

(65) Prior Publication Data
US 2013/0286916 A1    Oct. 31, 2013

(51) Int. Cl.
*H04W 24/00*    (2009.01)
*H04W 52/02*    (2009.01)
*H04L 1/00*    (2006.01)
*H04W 52/26*    (2009.01)
(Continued)

(52) U.S. Cl.
CPC .............. *H04W 52/02* (2013.01); *H04L 1/0003* (2013.01); *H04L 1/0009* (2013.01); *H04W 52/0206* (2013.01); *H04W 52/267* (2013.01); *H04L 1/20* (2013.01); *H04W 52/12* (2013.01)

(58) Field of Classification Search
USPC .............. 370/318, 252, 280, 281, 310.2, 311, 370/312, 317, 320, 329, 331, 332, 333, 334, 370/335; 375/285; 455/522, 13.4, 127.1, 455/12.1, 67.11, 69
See application file for complete search history.

(56) References Cited

U.S. PATENT DOCUMENTS

| 7,561,558 B2 * | 7/2009 | Agarossi et al. | 370/344 |
| 7,729,715 B2 * | 6/2010 | Love et al. | 455/522 |
| 8,150,447 B2 * | 4/2012 | Kazmi et al. | 455/522 |

(Continued)

FOREIGN PATENT DOCUMENTS

| CN | 1723676 A | 1/2006 |
| CN | 101035175 A | 9/2007 |

(Continued)

OTHER PUBLICATIONS

Hermann Rohling and Rainer Grunheid, Adaptive Coding and Modulation in an OFDM-TDMA Communication System, IEEE 1998, pp. 773-776.*

(Continued)

*Primary Examiner* — Phuongchau Ba Nguyen
(74) *Attorney, Agent, or Firm* — Rothwell, Figg, Ernst & Manbeck P.C.

(57) ABSTRACT

The embodiments herein relate to a method in a near end radio link node for controlling power consumption in a radio link system. The near end radio link node is connected to a far end radio link node via a radio link. The near end radio link node obtains a granted rate of traffic on the radio link between the near end radio link node and the far end radio link node. The near end radio link node obtains a demanded rate of the traffic between the near end radio link node and the far end radio link node. The near end radio link node controls power consumption for the radio link system based on the granted rate and the demanded rate.

21 Claims, 10 Drawing Sheets

(51) Int. Cl.
*H04W 52/12* (2009.01)
*H04L 1/20* (2006.01)

(56) References Cited

U.S. PATENT DOCUMENTS

| | | | |
|---|---|---|---|
| 8,594,716 B2* | 11/2013 | Watanabe et al. | 455/522 |
| 8,942,716 B2* | 1/2015 | Usuda et al. | 455/452.2 |
| 2004/0043783 A1* | 3/2004 | Anderson | 455/522 |
| 2004/0047328 A1* | 3/2004 | Proctor et al. | 370/342 |
| 2006/0183483 A1 | 8/2006 | Hidaka | |
| 2013/0286916 A1* | 10/2013 | Thorsen et al. | 370/311 |

FOREIGN PATENT DOCUMENTS

| | | | |
|---|---|---|---|
| EP | 1521398 A2 | 4/2005 | |
| EP | 2023558 A1 | 2/2009 | |
| EP | 2023558 A1 * | 11/2009 | ............ H04B 7/26 |
| WO | 2004025870 A1 | 3/2004 | |

OTHER PUBLICATIONS

First Office Action dated Nov. 20, 2015, CN Application No. 201080070964.3 with English translations of office action attached, 15 pages.

* cited by examiner

RATE OPTIMIZED POWER CONSUMPTION IN MICRO WAVE RADIO LINKS

CROSS-REFERENCE TO RELATED APPLICATION

This application is a 35 U.S.C. §371 National Phase Entry Application from PCT/EP2010/070869, filed Dec. 29, 2010, and designating the United States.

TECHNICAL FIELD

Embodiments herein relate generally to a near end radio link node, a method in the near end radio link node and a radio link system. More particularly the embodiments herein relate to controlling power consumption in a radio link system.

BACKGROUND

A microwave radio link or a radio link system is a communications system that uses a beam of radio waves to transmit signals or data between two locations. The locations may be of various distances apart. A simplified two-way radio link system 100 is illustrated in FIG. 1. The radio link system 100 comprises two radio link terminals/nodes 101 between which there is a data transfer system, for example a radio link/channel 102. The radio link 102 may comprise one or more carriers. Using the radio link node 101 shown at the left side of FIG. 1 as a reference point, the left radio link node 101 may be referred to as near end radio link node 101$n$, and the right radio link node 101 may be referred to as the far end radio link node 101$f$. The radio link system 100 comprises four main elements: two transmitters 103, two receivers 105, transmission lines 107, a radio link/channel 102 and antennas 110. The antennas 110 may be mounted on for example a base station tower. The transmitter 103 generates a microwave signal and modulates it with an input signal so that it conveys meaningful information to be communicated. Each radio link node 101 comprises a respective transmitter 103, a near end transmitter 103$n$ and a far end transmitter 103$f$. The transmission line 107 carries the signal from the transmitter 103 to the antenna 110 and, at the receiving end of the link, from the antenna 110 to the receiver 105. The antennas 110 emit the microwave signal from the transmission line 107 onto the radio link 102. At the receiver site, an antenna 110 pointed toward the transmitting station collects the signal energy and feeds it into the transmission line 107 or processing by the receiver 105. The receiver 105 extracts the microwave signal and demodulates it into its original form. Each radio link node 101 comprises a respective receiver 105, a near end receiver 105$n$ and a far end receiver 105$f$.

In some embodiments, the transmitter 103 and the receiver 105 may be incorporated into one unit, such as a transceiver. In yet other embodiments, the transmitter 103 and the receiver 105 may also be incorporated with the antenna 110 and transmission line 107 into one unit.

A radio link system 100 may operates on the duplex principle, which means that the system 100 comprises to connected radio link terminals 101 that may communicate with one another in both directions, they use two separate frequencies for transmitting and receiving data. Thus, in a duplex system 100, radio link terminal 1, e.g. the near end radio link terminal 101$n$, would send information to radio link terminal 2, e.g. the far end radio link terminal 101$f$, on frequency F1 while radio link terminal 2 would send information to radio link terminal 1 on frequency F2.

Radio link systems 100 used in telecom transmission systems have traditionally been used as wire replacement for voice circuit connections, thus operating at a fixed rate and generally with a very high requirement on availability at the rate the radio link system 100 is dimensioned for. Up until recently, voice traffic has dominated the transmission networks but over the last few years there has been an enormous growth of packet data traffic in communication networks. Microwave radio links systems 100 have taken on the challenge to meet the increasing demands for data traffic by several means.

At first, methods to map data traffic on circuit connections were developed, known as Ethernet over Time Division Multiplexing (EoTDM). This provides interfaces for data traffic, e.g. Ethernet interfaces. The radio link systems 100 still work at fixed rates and with quite poor utilization of the radio channel. This is mainly due to the overhead necessary for bonding and hierarchical multiplexing of individual tributaries. The granularity provided by hierarchical multiplexing is yet a problem.

The next step was the development of optimized transport schemes where circuit connection may coexist with native packet data transport. These systems are known as hybrid systems. The main characteristics of these systems are that multiplexing is no longer hierarchical and that bandwidth may be allocated arbitrary for packet data. This takes away many of the problems with granularity and bonding overhead. The possibility to allocate bandwidth arbitrary also makes it easier to utilize the radio spectrum provided. Arbitrary bandwidth allocation also provides the possibility to reallocate bandwidth from circuit connections to packet data as demands change. Together with Ethernet switching functions and Quality of Service (QoS) prioritization functions, it also enables the possibility of Adaptive Modulation and Adaptive Coding (ACM) in order to improve spectrum utilization. ACM is a method for automatically adapting a bit-rate to current channel conditions by altering the code rate and/or modulation scheme. The basic concept of these methods is that the radio link system 100 is dimensioned for high availability at a committed rate consisting of circuit connections and/or a portion of the packet data traffic. When external conditions permit, e.g. defined by the receiver bit error rate or Signal-to-Noise Ratio (SNR) in the receiver 105, throughput may be increased by reducing the overhead for error correction coding and/or using a higher order modulation scheme.

With Long Term Evolution (LTE) emerging as the new mobile system generation, the need for circuit connected transmission will decrease. The most recent radio link systems 100 are designed for pure packet transport. Support for circuit connection is still provided in many cases for these radio link systems 100 but now as circuit emulated connections in the Ethernet packet network. With the transition to packet, the networks also get denser and the throughput and functionality increases.

In order to support higher modulation schemes and higher output power, the transmitters 103 and power amplifiers used in radio link systems 100 have also been developed to better efficiency.

Adaptive Transmitter Power Control (ATPC) is a method for controlling transmitters' output power using the far end receiver as detector. ATPC t is used for transmit power management both for pure packet, hybrid and pure circuit connection radio link systems 100. Recent development including predistortion for radio amplifiers has not only lead to reduced output power, but also to lower power consumption due to ATPC since the radios may operate in to class AB with still excellent linearity at system level. Radio amplifiers may be classified using the classes A, B, AB, C, D and E. The classes are based upon the conduction angle or angle of flow of the input signal through the (or each) output amplifying device, that is, the portion of the input signal cycle during which the amplifying device conducts.

Adaptive modulation makes sure that throughput for the available radio link 102 is maximized at every time. Still, in typical mobile packet networks the amount of data actually transported normally varies by a factor of ten between night and day. There is also a big variation in traffic between weekdays and weekends.

This means that if conditions are good at night when only a small amount of packet data traffic is transported in the network, the radio link system 100 will adapt to a high rate. I.e. most of the time only idle traffic will be transported.

In a modern radio link system 100, the power dissipated is partly proportional to the rate and partly proportional to the output power. For a constant SNR in the receiver 105, the required output power has in its turn an exponential relation to the rate. In addition to this there is also a static power dissipation. Equation 1 below shows an expression for this. $P_0$ is the static power dissipation, $a_p$ and $a_e$ some proportional constants and B the exponential base for how power dissipation in the power amplifier (PA) scales with the rate.

$$P_D = P_0 + a_p \cdot r + a_e \cdot B^r \quad \text{(Equation 1)}$$

In a typical radio link system 100 the proportional part scales by 10% and the exponential by 50% of the maximum power dissipation between the highest and lowest rates. If the rate r is expressed in bits/symbol, the B parameter may assume values between 1 and 2. B=1 corresponds to an amplifier having its power consumption constant with output power. B=2 corresponds to a hypothetical amplifier with constant efficiency with regard to output power. Real life Radio Frequency (RF) amplifiers using linearization techniques operate somewhere between class A and B, a.k.a. class AB and are located somewhere in between those extremes. But even with B=1.1, i.e. reducing the Power Amplifier (PA) output power by half will reduce the power consumption by 10%, there will be a significant scaling with rate in the PA power consumption.

In multiple carrier systems this is even more conspicuous; some of the carriers may at times transport idle traffic only. Regard e.g. a dual carrier system with adaptive modulation from 2-10 bits/symbol. If this system is running at its highest rate when the actual throughput is 10%, corresponding to one carrier running at its lowest rate, it consumes up to 85% of its power transporting idle patterns.

Power consumption is an important contributor to the cost of ownership for the transmission systems. When the networks grow denser, power consumption will become even more important. And it is not only the OPerating EXpenditures (OPEX) for electrical energy but also CApital EXpenditures (CAPEX) related to dimensioning of the power distribution and generation, e.g. cabling, solar cells, batteries, generators etc., that is affected. OPEX is the ongoing cost for running a system, and CAPEX is the cost of developing or providing non-consumable parts for the system.

From the example above, where 85% of the power was used to run idle traffic and with the knowledge that traffic during night, i.e. ⅓ of the time, is 10% of the traffic at day, the conclusion is that up to 30% of the power consumed in current packet radio link systems 100 is misused.

The above discussion focuses on reducing the amplifier output power in order to reduce power consumption, requiring a particular design and characteristics of the amplifier.

SUMMARY

The objective of embodiments herein is therefore to obviate at least one of the above disadvantages and to provide improved power consumption and throughput in micro wave radio link systems.

According to a first aspect, the objective is achieved by a method in a near end radio link node for controlling power consumption in a radio link system. The near end radio link node is connected to a far end radio link node via a radio link. The near end radio link node obtains a granted rate of traffic on the radio link between the near end radio link node and the far end radio link node. The near end radio link node obtains a demanded rate of the traffic on the radio link between the near end radio link node and the far end radio link node. The near end radio link controls power consumption for the radio link system based on the granted rate and the demanded rate.

According to a second aspect, the objective is achieved by a near end radio link node for controlling power consumption in a radio link system. The near end radio link node is connected to a far end radio link node via a radio link. The near end radio link node comprises an obtaining unit configured to obtain a granted rate of traffic on the radio link between the near end radio link node and the far end radio link node. The obtaining unit is further configured to obtain a demanded rate of the traffic on the radio link between the near end radio link node and the far end radio link node. The near end radio link node comprises a controlling unit configured to control power consumption for the radio link system based on the granted rate and the demanded rate.

Since the Signal-to-Noise Ratio is traded for total power dissipation, improved power consumption and throughput is improved in micro wave radio link systems.

Embodiments herein afford many advantages, for which a non-exhaustive list of examples follows:

Embodiments herein provide the advantage of reducing output power in addition to power consumption in a radio link system. The embodiments meet the increasing demands for data traffic by several means. Further benefits are that both the investment cost and the cost of ownership for a radio link system is reduced with reduced power consumption. Also the time between failures will decrease when power consumption and thus operating temperatures decreases. Further, Radio Frequency Electro Magnetic Interference phenomena experienced by other devices will be reduced together with average output power.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity, emphasize is instead being placed upon illustrating the principle of the embodiments herein.

DETAILED DESCRIPTION

The embodiments herein relate to a point to point duplex radio link system based on Time Division (TD), Frequency Division (FD) or Code Division (CD).

Figure 1:
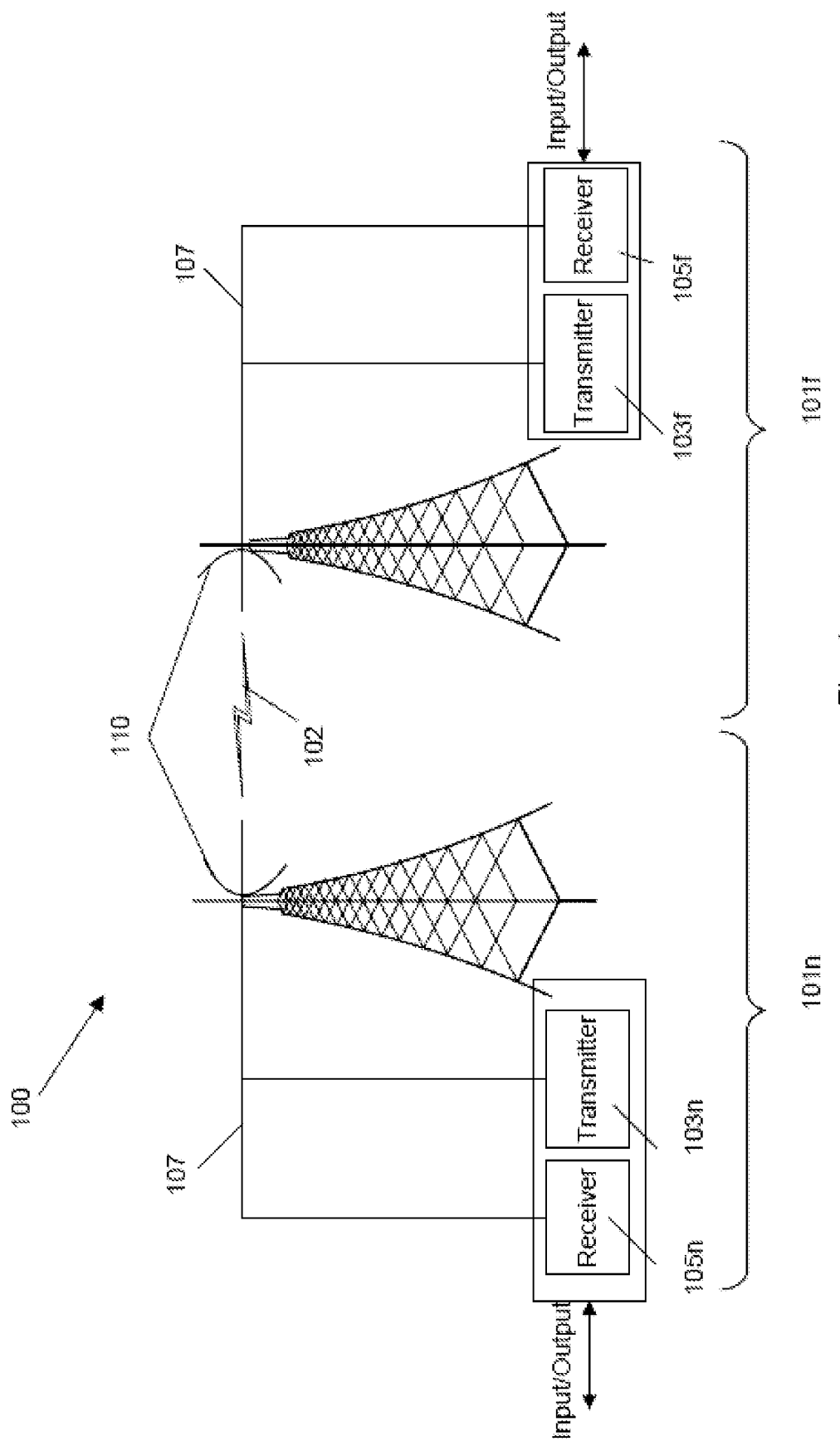
FIG. 1 is a schematic block diagram illustrating embodiments of a radio link system.
Figure 2:
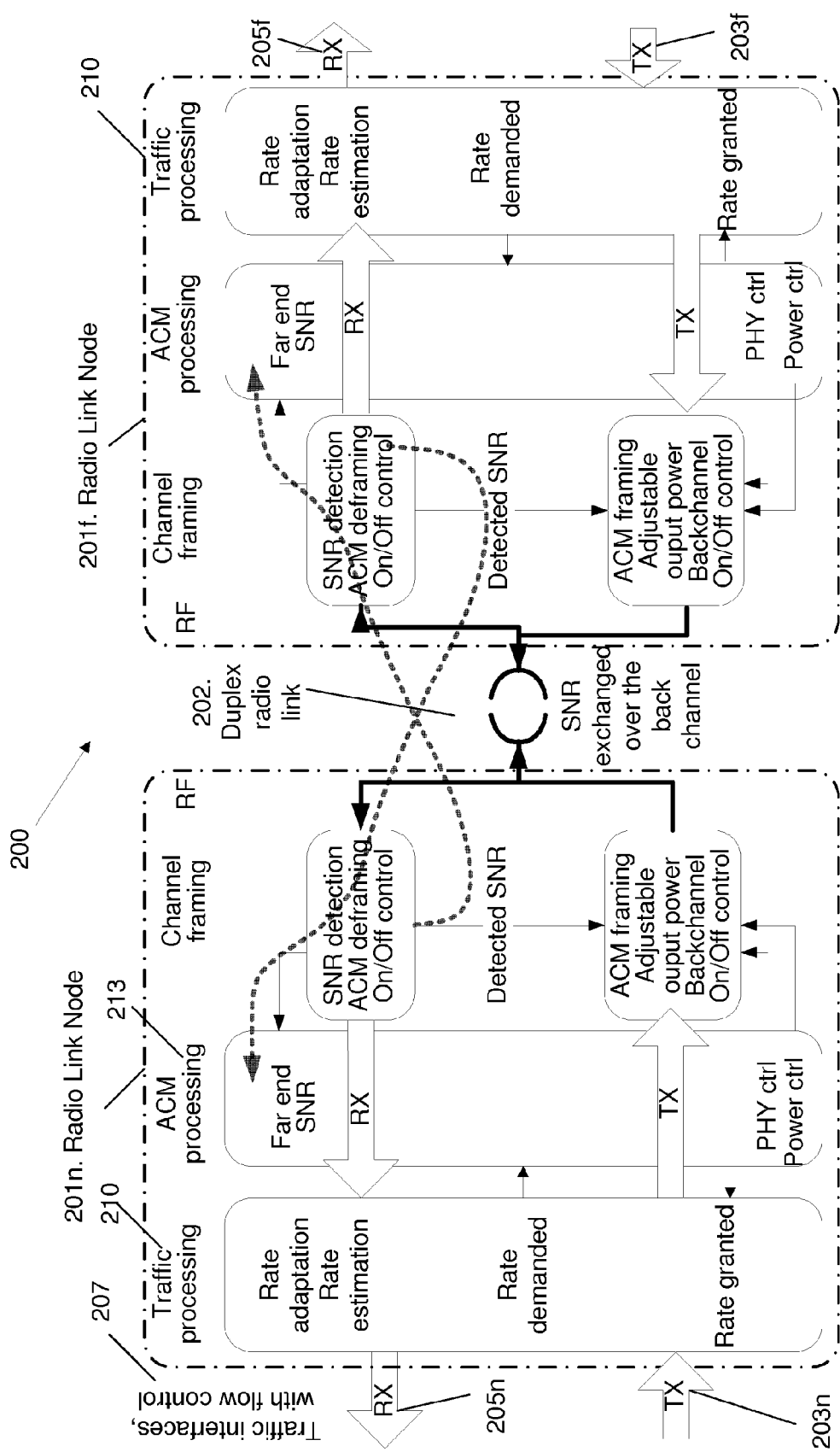
FIG. 2 is a schematic block diagram illustrating embodiments of a one carrier radio link system.

FIG. 2 shows, as an example, a one carrier duplex radio link system 200. Duplex may be implemented by separation in frequency (FD), time (TD) or code (CD). The radio link system 200 comprises a near end radio link node 201n and a far end radio link node 201f connected via a data transfer system, such as e.g. a carrier duplex radio link/channel 202. The near end radio link node 201n comprises a near end transmitter 203n and a near end receiver 205n. The far end radio link node 201f comprises a far end transmitter 203f and a far end receiver 205f. An information signal is provided to a traffic interface 207 of for example the near end receiver 205n and is moved with the help of the radio link 202 to the far end receiver 205f of the far end radio link node 201f.

A radio link system 200 may be symmetric, and the terms near and far is used for selecting a reference point for describing the system 200.

Each radio link node 201, e.g. the near end radio link node 201n and far end radio link node 201f supports the following functions:

Measure the momentary SNR of the receiver 205 with an integration period that is relevant to the dynamic characteristics of the radio channel 209, e.g. fading velocity etc.

Automatically adapt to the modulation scheme and/or coding rate, e.g. PHYsical mode (PHY), currently used by the far end transmitter 203f.

Especially for multiple carrier systems: Individually turn off and turn on transmitters 203 and receivers 205.

Measure, i.e. estimate or be aware of, the momentary demand of capacity from the traffic interfaces 207 with an integration period that is relevant to the dynamic characteristics of the traffic interfaces 207, i.e. a demanded traffic rate.

Control the output power, or any other parameter required to implement the function, for each carrier individually.

Control the modulation scheme and/or coding rate, i.e. PHY, of the transmitters 203.

Provide a backchannel over the hop for each carrier carrying measured SNR and the status of each transmitter 203 whether they are on or off.

The references to transmitters 203 and receivers 205 above, refers to transmitters and receivers in general, assuming a symmetric radio link system.

The rate is equivalent to the speed of the data signals, measured in bits per second.

SNR is the signal to nose ratio for a received signal.

The PHYsical mode (PHY) mentioned above refers to a specific combination of Coding and Modulation in an ACM system.

Each radio link node 201 implements a control function according to the following 1. Using the far end receiver SNR, from the backchannel, the current modulation scheme used by the near end transmitter 203n, current output power, or other parameter and the locally measured demanded traffic rate.

If a demanded traffic rate is higher than supported by the current PHY; Increase output power, or control other parameter, until the far end SNR allows switching to a high enough PHY. If that is not possible, increase output power, or control other parameter, to the maximum allowed. Then switch to the highest PHY allowed by SNR.

If the demanded traffic rate is lower than supported by the current PHY; switch to the lowest PHY allowed by the demanded traffic rate. Then decrease output power, or control other parameter, until the far end SNR matches the current PHY.

If the far end SNR is too low for the current PHY; increase output power, or control other parameter, until the SNR is good enough. If required SNR may not be fulfilled with maximum power, or limit reached on other parameter; switch to a lower PHY where SNR is sufficient.

If the far end SNR is higher then required for the current PHY; decrease output power, or control other parameter, until SNR is good enough.

2. In the case of multiple carrier systems, use a locally/near end measured demanded traffic rate and the far end transmitter 203f status according to the following:

Completely turn off the near end transmitter 203n for a carrier if the demanded traffic rate allows that.

Turn on the near end transmitter 203n for a carrier if the demanded traffic rate requests that.

Completely turn off the near end receiver 205n for a carrier if the back channel indicates that the corresponding far end transmitter 203f has been turned off.

Turn on the near end receiver 205n for a carrier if the back channel indicates that the corresponding far end transmitter 203f has been turned on.

This will result in a radio link system 200 that optimizes power and throughput in the following ways:

1. Maintain specified Bit Error Rate (BER) in the receiver 205.
2. Provide sufficient throughput for the current traffic rate demand.
3. Minimize power consumption.

The Bit Error Rate is the expected or measured rate at which bits are misinterpreted over a communication link. BER is defined as the quotient of bits received in error over all received bits.

The embodiments herein trade SNR for total power dissipation, which may be implemented in a transmitter, such as for example an amplifier. However other possible alternatives for other parameters comprise, but are not limited to, e.g.:

Local oscillators, reduced power→increased phase noise.

Low-noise amplifier (LNA), reduced power→deterioration of noise figure and linearity.

The embodiments herein also cover these alternatives.

Rate Adaptation

Returning to FIG. 2. Each radio link node 201 comprises a traffic processing block 210. The variable rate user traffic is connected to the radio link system 200 through the traffic interface 207. The traffic processing block 210 implements a rate adaptation function and a rate estimation function.

When the rate on the traffic interface 207 is lower than the rate provided over the radio link 202, idle fill data is inserted in the transmit direction and removed in the receive direction by the rate adaptation function.

If the rate on the traffic exceeds that provided by the radio link 202, different embodiments may be used depending on the protocol layer that the traffic processing block 210 operates on.

When traffic processing 210 is aware of traffic types, e.g. Class of Service (CoS), and comprises a set of rules for prioritization between traffic types, a QoS function may implement the rate adaptation. I.e. when buffering resources in the traffic processing block 210 gets exhausted, lower priority traffic is thrown away. CoS is a method for labeling different types of traffic entering a transmission system for prioritization.

If traffic processing 210 is unaware of traffic content, a downstream flow control may implement the rate adaptation. When buffering resources start to get exhausted, traffic processing requests the sending entity to operate at a lower speed. E.g. in an Ethernet system this may be done by sending PAUSE requests. The sending unit may be any device providing data to the traffic interface 207, e.g. an Ethernet switch or a router.

Rate Estimation

The purpose of a rate estimation function is to calculate a demanded rate ($R_D$) to an ACM processing block 213. This is done with the following parameters as input:

Granted rate ($R_G$), this is the rate the radio link 202 is currently running at. $R_G$ is provided by the ACM processing block 213.

Idle rate ($R_I$), this is the rate at which the rate adaptation function inserts idle data into the data stream. As mentioned above, the rate adaptation function is implemented in the traffic processing block 210.

Rejection rate ($R_R$), this is the rate of rejected data. When the rate adaptation function implements a QoS function the rejection rate may be calculated. The rejected data may be the data actually thrown away, e.g. through Class of Service prioritization, or the data that may have been received on the traffic interface 207 during the time it has been blocked by Flow Control/Back Pressure. When a flow control scheme is used, the rejection rate may be calculated as $R_R=(r_P*R_G)/(1-r_P)$ where $r_P$ is the pause ratio on the traffic interface 207. If e.g. $r_P$ is 90%, $R_R$ will be $R_R=(0.9*R_G)/(1-0.9)=9*R_G$.

From the above the demanded rate may be calculated as $$R_D=R_G+R_R-R_I \quad \text{(Equation 2)}$$

ACM Processing Block

Figure 3:
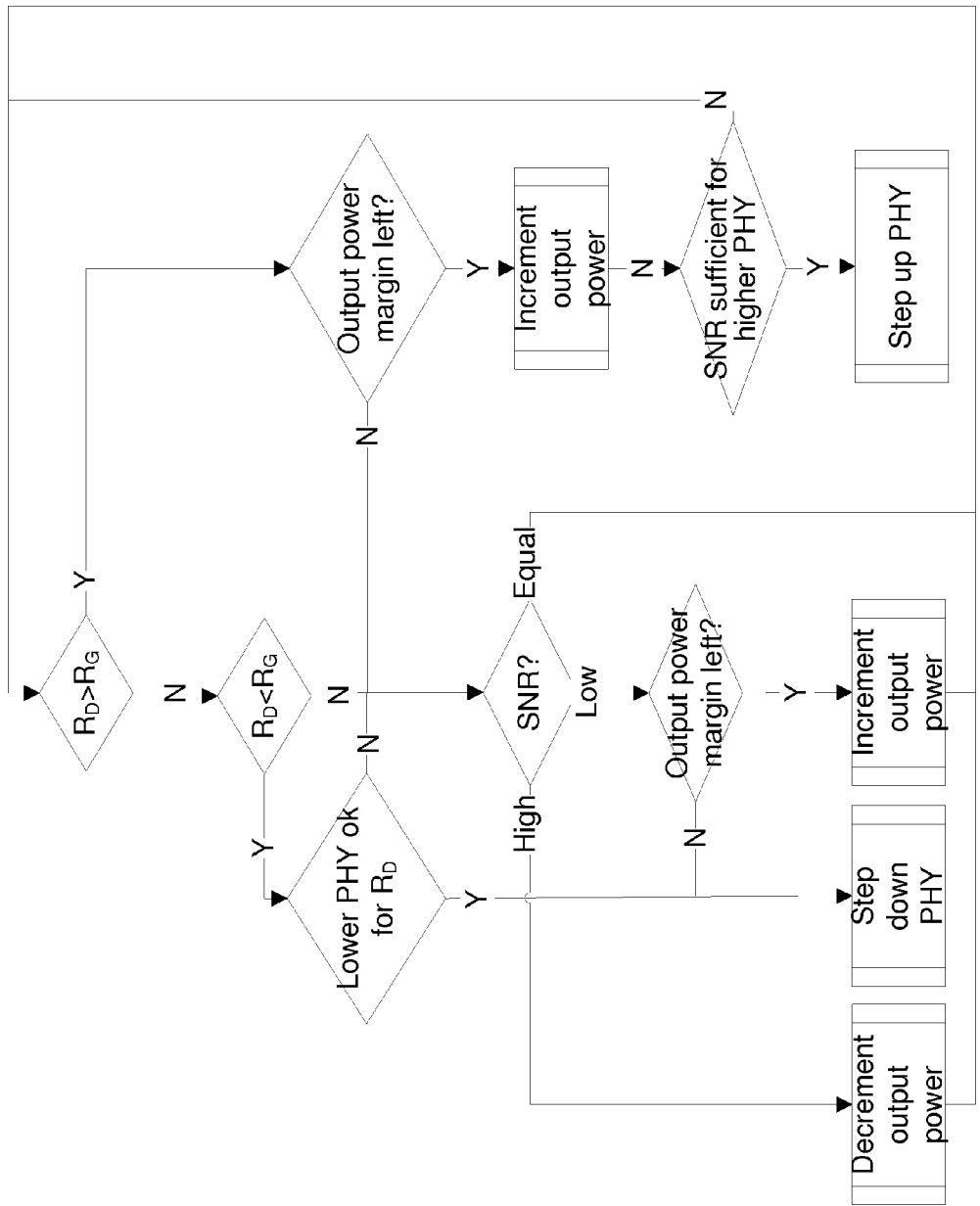
FIG. 3 is a flow chart illustrating embodiments of an ACM processing block.

The ACM processing block 213 mentioned above may perform several tasks. The flow chart in FIG. 3 shows the details of the function performed by the ACM processing block 213. In the figure "output power" implicitly refers to any other parameter used to implement the function.

It maintains specified BER in the far end receiver 205f by monitoring the far end SNR and adjusts the output power, or other parameter, up or down accordingly for the current PHY.

It steps down to a lower PHY if BER/SNR requirements are not fulfilled when the maximum output power, or the limit of other parameter, is reached.

It calculates a $R_G$ corresponding to the current PHY.

It calculates a PHY corresponding to the current $R_D$. If $R_D$ is less then $R_G$, it steps down to the PHY next higher to the one corresponding to $R_D$ and then reduces the output power, or controls other parameter, while monitoring the far end SNR for maintained specified BER.

If $R_D$ is higher then $R_G$, it increases the output power, or controls other parameter, while monitoring the far end SNR to be sufficient for the PHY next higher to $R_D$. When that SNR is reached it steps up to that PHY. If maximum power, or the limit of other parameter, is reached before a sufficient SNR can be detected, the PHY is stepped up to the highest possible for that SNR.

Extension to Multiple Carriers

Figure 4:
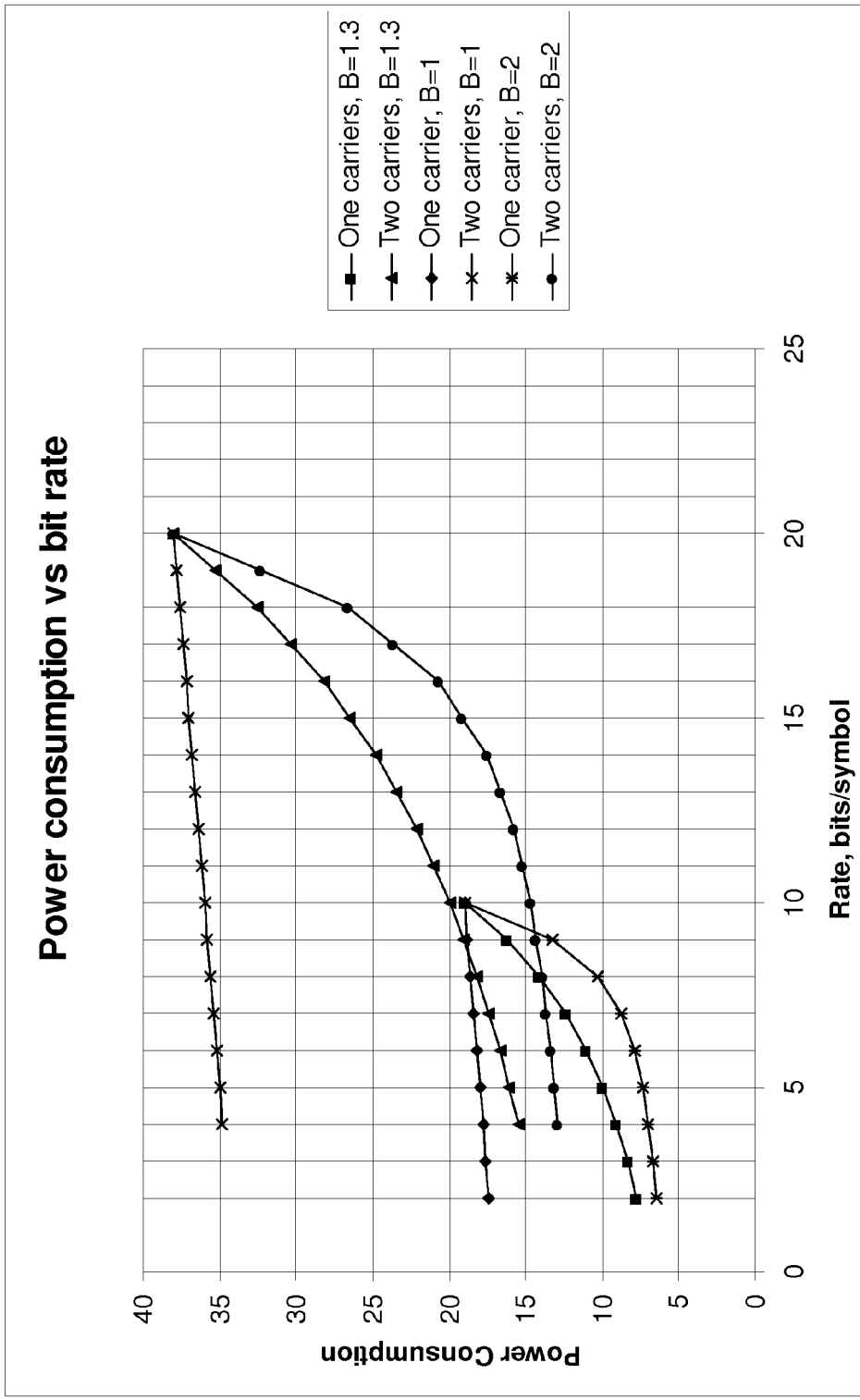
FIG. 4 is a graph illustrating power consumption.

In a multiple carrier system, both the near end transmitter 203n and far end receiver 205f may be shut off if the current combined capacity of all active carriers not is required. FIG. 4 shows an example of the power consumption as a function of throughput rate for a "perfect channel" with B=1, B=2 and B=1.3. I.e. with maximum output power it is possible to run the highest PHY. In this example, per carrier with reference to Equation 1, the static power dissipation P0 is 6 W per carrier, and the linear part scales from 0.4 W to 2 W per carrier from the lowest to the highest rate, and an efficiency of 9.1% in the amplifier when it is operating at its highest output power of +30 dBm. The power amplifier (PA) dissipates 11 W at its maximum output power. Two groups of three curves are shown. The group on the top shows the situation with two carriers, rates stretching from 4 to 20 bits/symbol. The group on the bottom shows 2 to 10 bits/symbol achievable with one carrier. The top curve in each group shows the situation with a pure a PA with constant power dissipation, and the bottom curve with a constant efficiency. The curve in between shows what is assumed to be a realistic assumption for a PA working somewhere in class AB.

The bottom curves in the FIG. 4 example, shows that power consumption is actually higher for one carrier than two carries at 10 bits/symbol. With high efficiency PAs and low overall static power consumption, extra power savings by turning off one carrier becomes harder earned. Still it is an advantage for all cases shown in the figure and for pure class A PAs it is more or less the only option.

If it is worthwhile to turn off/on, the carriers may have to be analyzed on a case to case basis. In the following the additional functionality necessary to perform the operation is described.

Figure 5A:
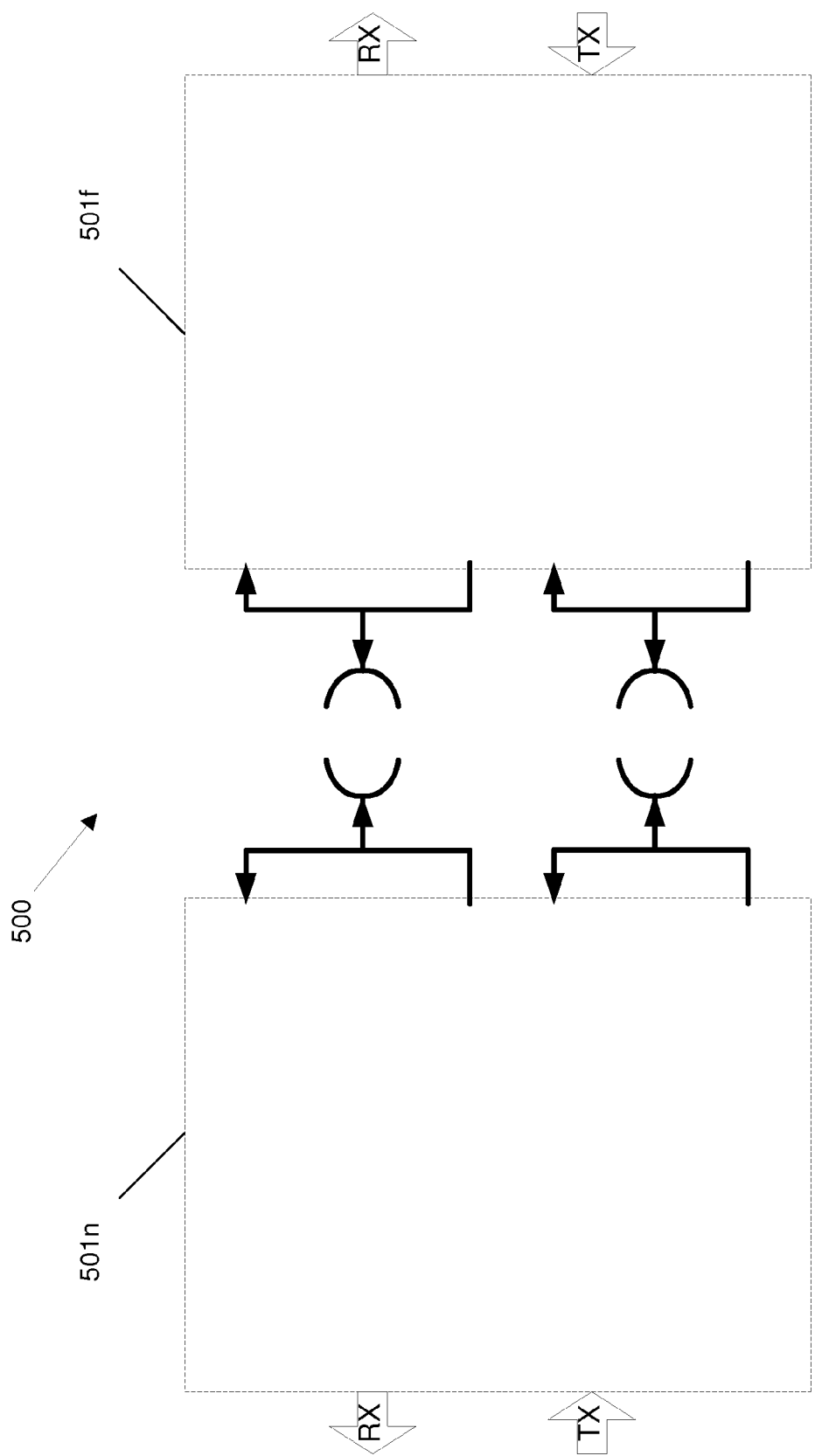
FIGS. 5a and b are block diagrams illustrating embodiments of a multiple carrier radio link system.
Figure 5B:
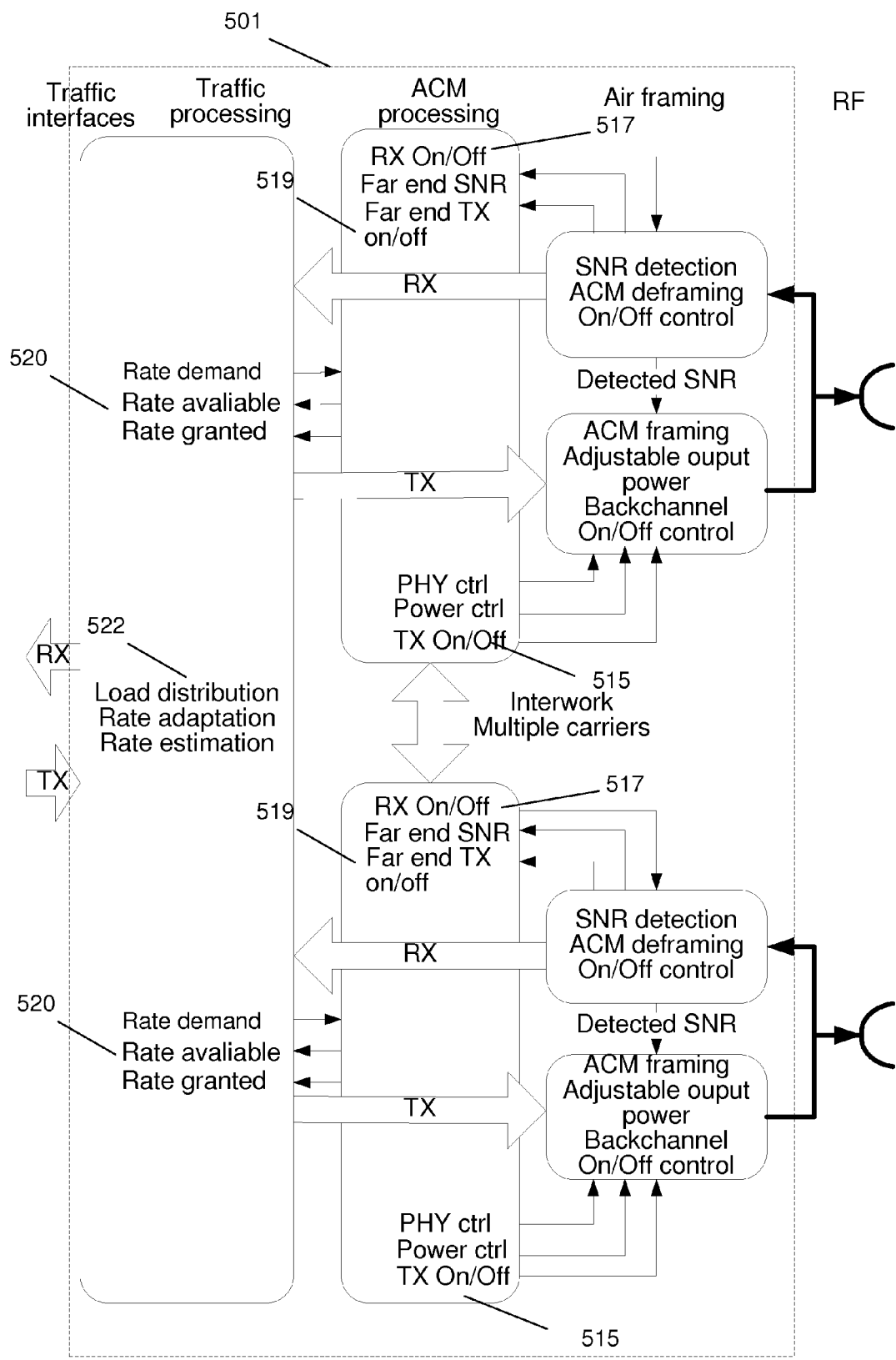

FIGS. 5a and b show an embodiment of a dual carrier radio link system 500. FIG. 5a shows the dual carrier system 500 comprising two radio link nodes, i.e. a far end radio link node 501f and a near end radio link node 501n. FIG. 5b shows an embodiment of the near end radio link 501n in a dual carrier system 500. The far end radio link node 501f is an invert equivalent of the near end radio link node 501n, and is therefore not shown in a separate figure. An expansion to arbitrary number of carriers is understood by a skilled person, and the expansion is trivial with respect to the functionality described here and in the following no limitation on the number of carriers controlled is made.

Compared to the one carrier duplex radio link system 200 shown in FIG. 2, the additional control functionality of a dual carrier system 500 comprises:

An on/off control of each transmitter individually, TX On/Off 515.

An on/off control of each receiver individually, RX On/Off 517.

A function that carries the transmitter status, i.e. on or off, for every carrier on each carrier's backchannel, Far End TX on/off 519. Rationale is that when a carrier is turned off, this may only be reported to the far end using a still operating carrier.

Calculation of available rate $R_A$ 520 for each carrier. Available rate is defined as the rate possible to achieve by the carrier if SNR is increased by the current PA output power margin.

A load distribution function 522 utilizing the available rate calculation.

For the sake of simplicity, elements comprised in the dual carrier system 500 which are also comprised in the one carrier duplex radio link system 200 are not described again here with reference to FIG. 5.

Load Distribution Based on Available Rate

Assuming an existing load distribution function able to distribute the incoming traffic on N multiple carriers, an additional function that distributes a change in demanded rate between the carriers optimally from a power consumption perspective may be defined.

With $R_G$ as the sum of the individual $R_G$ for each carrier, Equation 2 is still valid in a multi carrier system.

$$R_D = \Sigma_{n=0}^{N-1} R_{g_n} + R_R - R_I \qquad \text{(Equation 3)}$$

Rate adaptation is still made at the traffic interface 207 and the definition of $R_R$ and $R_I$ remains unchanged.

The optimum way is to distribute the demanded rate between the carries according the relative available rate defined as:

$$\mu_{r_m} = \frac{R_{A_m}}{\sum_{n=0}^{N-1}(R_{A_n})} \qquad \text{(Equation 4)}$$

From this the demanded rate for an individual carrier may be written:

$$R_{D_m} = \mu_{r_m} \cdot R_D \qquad \text{(Equation 5)}$$

A linear increase in rate means an exponential increase in power, i.e. a cost function that prefers carriers with high available rate will minimize power consumption.

Turning Off Carriers

The method described in the previous paragraph will eventually bring all carriers to the same rate margin, which also was the intention and optimum from a power dissipation standpoint.

The dynamic behavior of the radio channel must be considered when deriving an optimum criterion for turning off a carrier. A carrier experiencing fading will "push" traffic to the other carriers in order to maintain rate margin. This will increase the output power for the other carriers. If the fading carrier is turned off also the remaining traffic is pushed to the other carriers.

If this results in less power dissipation than waiting for the fading situation to be restored depends on how power dissipation is distributed between static and dynamic contributions.

The conclusion from this is that the carrier running at the highest rate should be turned off when there are enough margins to do that. This condition is formulated in equation 6 below:

$$R_D + R_{marg_{off}} < \left(\sum_{\substack{n=0 \\ n \neq m}}^{N-1} R_{A_n}\right); R_{G_m} = \max_{p=0}^{N-1}(R_{G_p}) \qquad \text{(Equation 6)}$$

In other words, when the demanded rate is less then the sum of all available rates plus some margin except the carrier running at the highest rate, it is safe to turn off that carrier.

After one carrier has been turned off, e.g. by setting $R_D=0$, the procedure may be repeated with the remaining carriers.

Turning on Carriers

When the receiver and transmitter for a carrier are turned off there is no way to estimate the channel conditions, and hence $R_A$ for the powered down carriers are unknown.

Still it is possible to set up a condition for when a carrier needs to be turned on; when the demanded rate, plus some margin, is larger than the sum of available rates for the still operating carriers.

$$R_D + R_{marg_{on}} > \left(\sum_{\substack{n=0 \\ n \neq m}}^{N-1} R_{A_n}\right); \forall m; \qquad \text{(Equation 7)}$$

$$Carrier_m \in \text{turned\_off\_carriers}$$

Two embodiments of a method may be considered:

The first embodiment may be to turn on all carriers when the condition in Equation 7 is fulfilled. If the available rate after that exceeds what fulfills the condition in Equation 6, carriers will be turned off again. Doing this will provide a swift response to changes in the demanded rate.

The second embodiment may be to assume that the turned off carriers will provide maximum available rate when they are turned on. In this case an arbitrary carrier may be turned on. If that is not sufficient, additional carriers are turned on according to the same rule until the condition in Equation 7 is false or the maximum number of carriers is reached.

Figure 6:
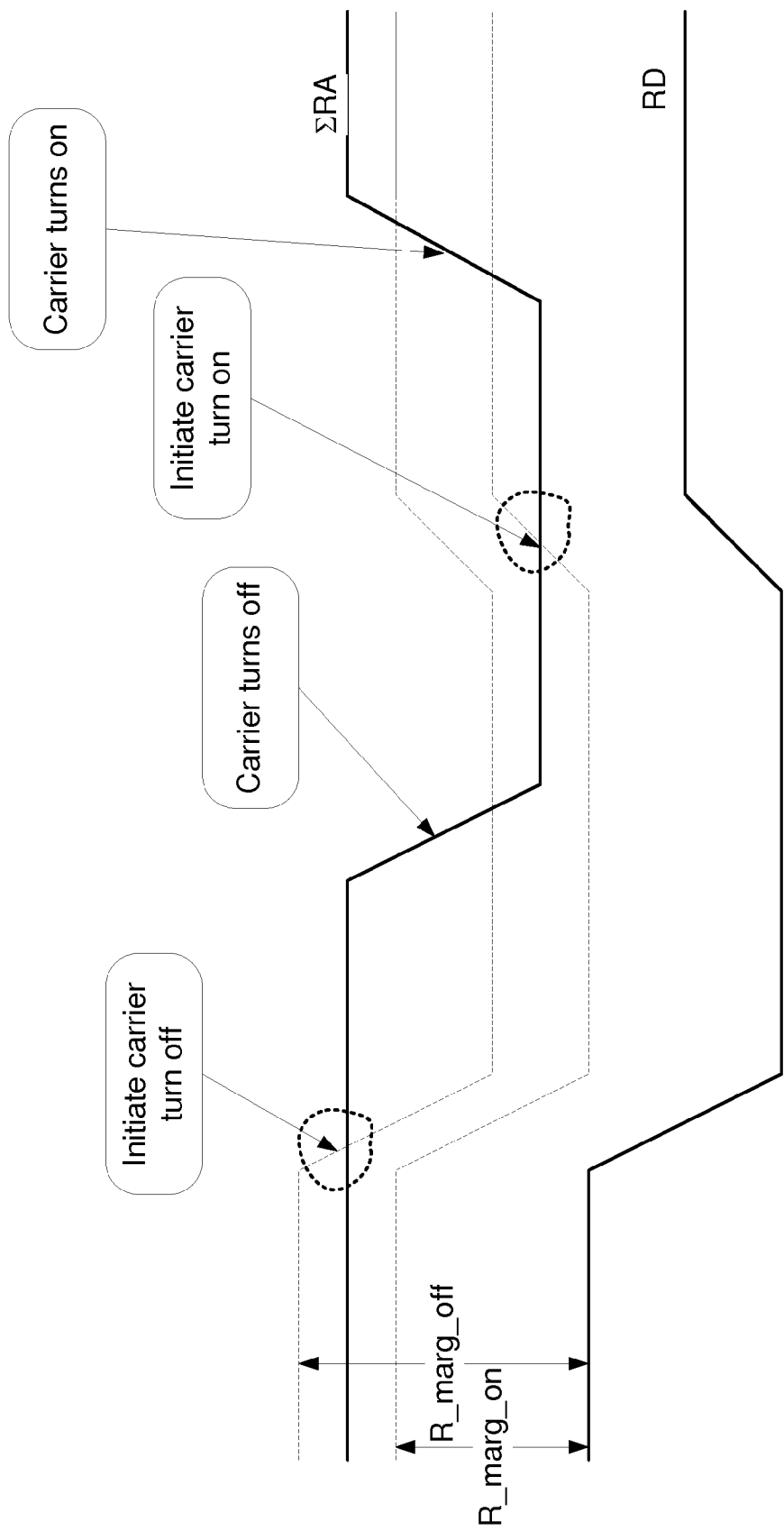
FIG. 6 is a diagram illustrating embodiments for conditions for turning on and off carriers due to change in the demanded rate.
Figure 7:
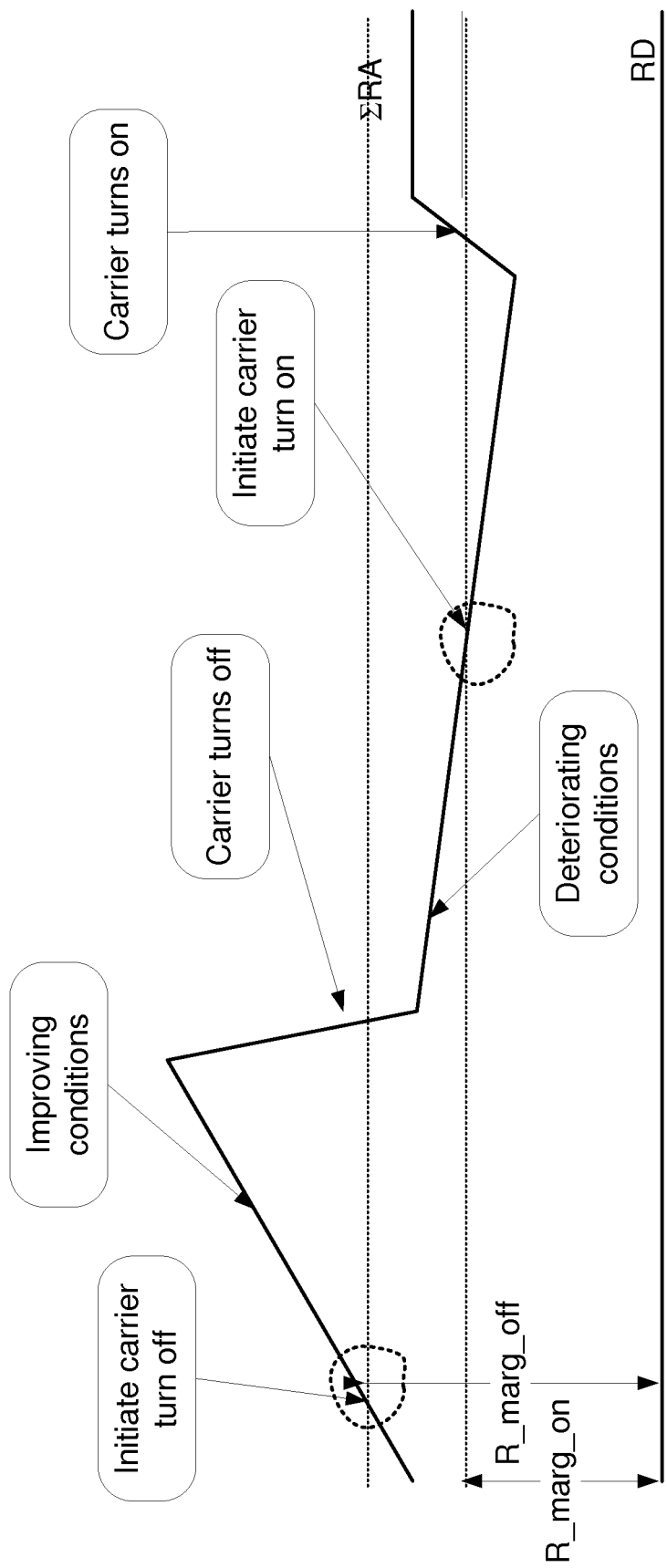
FIG. 7 is a diagram illustrating embodiments for conditions for turning on and off carriers due to change in the available rate.

FIG. 6 shows a diagram on the conditions for turning on and off carriers due to change in the demanded rate. FIG. 7 shows the situation when there is a variation in the available rate.

Figure 8:
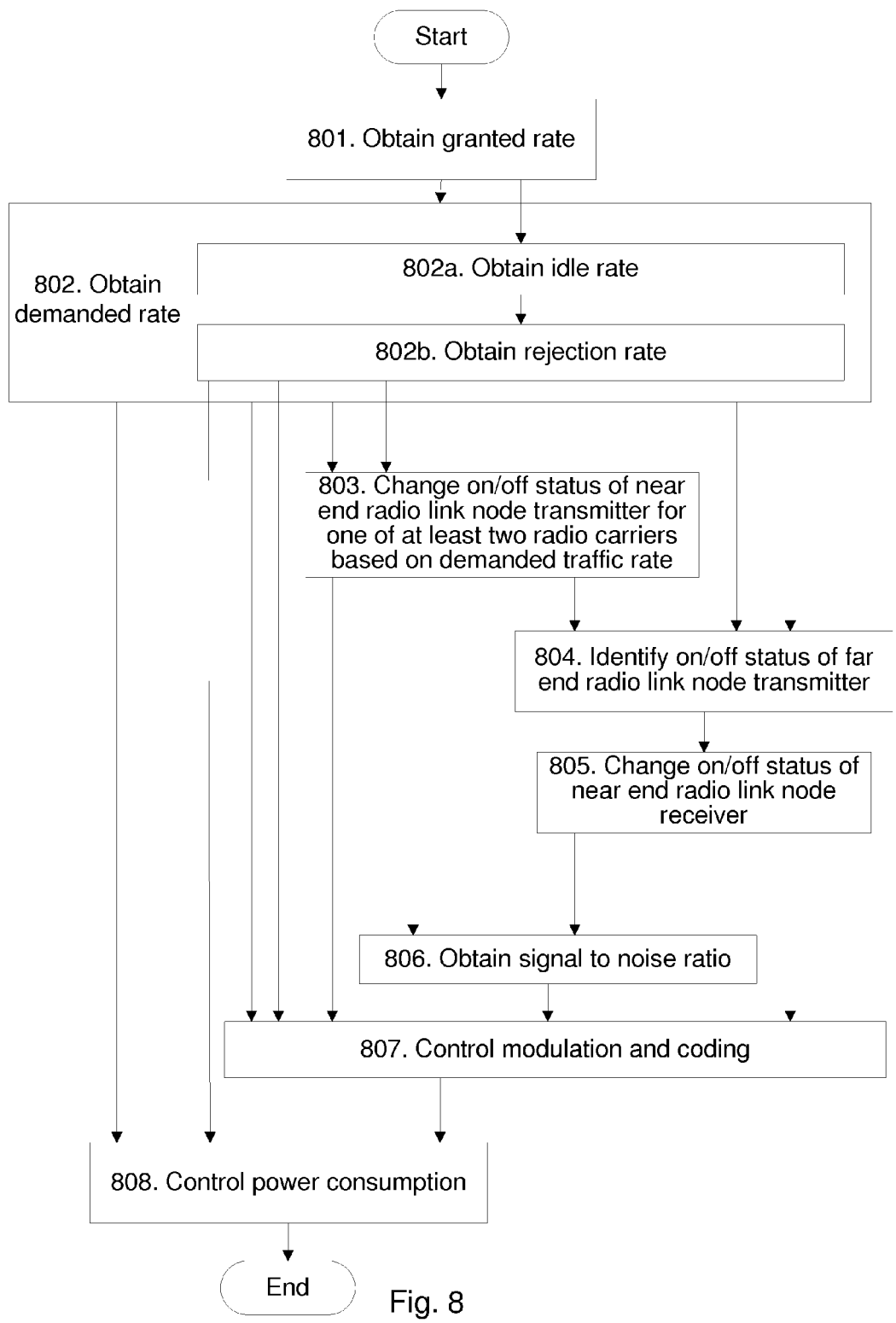
FIG. 8 is a flowchart depicting embodiments of a method in a near end radio link node.

The method described above will now be described seen from the perspective of the near end radio link node 201n, 501n. FIG. 8 is a flowchart describing the present method in the near end radio link node 201n, 501n for controlling power consumption in a radio link system 200, 500. The near end radio link node 201n, 501n is connected to a far end radio link node 201f, 501f via a radio link 202. The method comprises the steps to be performed in the near end radio link node 201n, 501n:

Step 801

The near end radio link node 201n, 501n obtains a granted rate of traffic on the radio link 202 between the near end radio link node 201n, 501n and the far end radio link node 201f, 501f.

Step 802

The near end radio link node 201n, 501n obtains a demanded rate of the traffic on the radio link 202 between the near end radio link node 201n, 501n and the far end radio link node 201f, 501f.

Step 802a

In some embodiments, this is a substep of step 802.

The near end radio link node 201n, 501n may obtain an idle rate of the traffic on the radio link 202 between the near end radio link node 201n, 501n and the far end radio link node 201f, 501f.

Step 802b

In some embodiments, this is a substep of step 802, and a step to be performed after step 802a.

The near end radio link node 201n, 501n may obtain a rejection rate of the traffic on the radio link 202 between the near end radio link node 201n, 501n and the far end radio link node 201f, 501f. The demanded rate may be based on the granted rate, idle rate and rejection rate.

Step 803

In some embodiments, the near end radio link node 201n, 501n changes a power state of a near end radio link node transmitter 203n for one of at least two radio carriers in the radio link 202 based on the demanded traffic rate.

Step 804

In some embodiments, the near end radio link node 201n, 501n identifies a power state of a far end radio link node transmitter 203f.

Step 805

In some embodiments, the near end radio link node 201n, 501n changes a power state of a near end radio link node receiver 205n for one of at least two radio carriers in the radio link 202 based on the identified on/off status of the far end radio link node transmitter 203f.

Step 806

In some embodiments, the near end radio link node 201n, 501n obtains a signal to noise ratio for traffic received at a far end radio link node receiver 205f.

Step 807

In some embodiments, the near end radio link node 201n, 501n controls a modulation and coding rate of the traffic on the radio link 202 between the near end radio link node 201n, 501n and the far end radio link node 201f, 501f. In some embodiments, the controlling modulation and coding rate is based on at least one of the signal to noise ratio, granted rate and demanded rate.

Step 808

The near end radio link node 201n, 501n controls power consumption for the radio link system 200, 500 based on the granted rate and the demanded rate.

In some embodiments, the controlling power consumption is further based on the signal to noise ratio.

Figure 9:
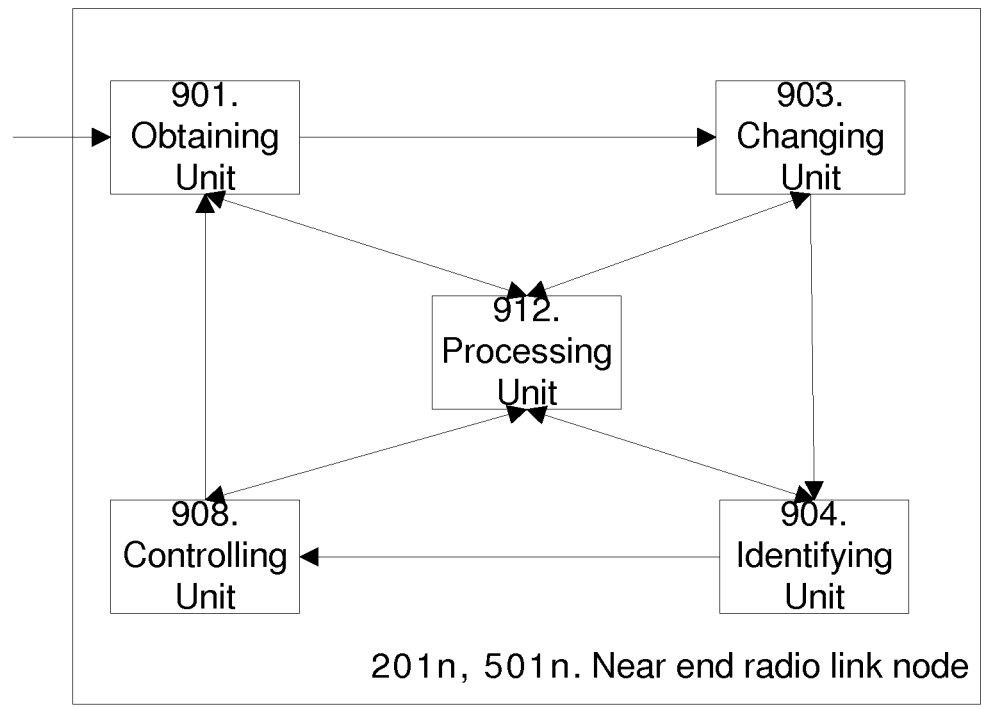
FIG. 9 is a schematic block diagram illustrating embodiments of a near end radio link node.

To perform the method steps shown in FIG. 8 for controlling power consumption in a radio link system 200, 500 the near end radio link node 201n, 501n comprises a near end radio link node arrangement as shown in FIG. 9. As mentioned above, the near end radio link node 201n, 501n is connected to a far end radio link node 201f, 501f via a radio link 202.

The near end radio link node 201n, 501n comprises an obtaining unit 901 configured to obtain a granted rate of traffic on the radio link 202 between the near end radio link node 201n, 501n and the far end radio link node 201f, 501f. The obtaining unit 901 is further configured to obtain a demanded rate of the traffic on the radio link 202 between the near end radio link node 201n, 501n and the far end radio link node 201f, 501f. In some embodiments, the obtaining unit 901 is further configured to obtain an idle rate of the traffic on the radio link 202 between the near end radio link node 201n, 501n and the far end radio link node 201f, 501f. In some embodiments, the obtaining unit 901 is further configured to obtain a rejection rate of the traffic on the radio link 202 between the near end radio link node 201n, 501n and the far end radio link node 201f, 501f. In some embodiments, the demanded rate is based on the granted rate, idle rate and rejection rate. In some embodiments, the obtaining unit 901 is further configured to obtain a signal to noise ratio for traffic received at a far end radio link node receiver 205f. In some embodiments, the controlling power consumption is further based on the signal to noise ratio.

In some embodiments, the near end radio link node 201n, 501n comprises a changing unit 903 configured to change a power state of a near end radio link node transmitter 203n for one of at least two radio carriers in the radio link 202 based on the demanded traffic rate. In some embodiments, the changing unit 903 is further configured to change a power state of a near end radio link node receiver 205n for one of at least two radio carriers in the radio link 202 based on the identified on/off status of the far end radio link node transmitter 203f.

In some embodiments, the near end radio link node 201n, 501n further comprises an identifying unit 904 configured to identify a power state of a far end radio link node transmitter 203f.

The near end radio link node 201n, 501n further comprises a controlling unit 908 configured to control power consumption for the radio link system 200, 500 based on the granted rate and the demanded rate.

In some embodiments, the controlling unit 908 is further configured to control a modulation and coding rate of the traffic on the radio link 202 between the near end radio link node 201n, 501n and the far end radio link node 201f, 501f. In some embodiments, the controlling modulation and coding rate is based on at least one of the signal to noise ratio, granted rate and demanded rate.

The present mechanism for controlling power consumption in a radio link system 200, 500 may be implemented through one or more processors, such as a processor 912 in the near end radio link node 201n, 501n depicted in FIG. 9, together with computer program code for performing the functions of the embodiments herein. The processor may be for example a Digital Signal Processor (DSP), Application Specific Integrated Circuit (ASIC) processor, Field-programmable gate array (FPGA) processor or micro processor. The program code mentioned above may also be provided as a computer program product, for instance in the form of a data carrier carrying computer program code for performing the present solution when being loaded into the near end radio link node 201n, 501n. One such carrier may be in the form of a CD ROM disc. It is however feasible with other data carriers such as a memory stick. The computer program code can furthermore be provided as pure program code on a server and downloaded to the near end radio link node 201n, 501n remotely.

The embodiments herein are not limited to the above described preferred embodiments. Various alternatives, modifications and equivalents may be used. Therefore, the above embodiments should not be taken as limiting the scope of the embodiments herein, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasized that the steps of the methods defined in the appended claims may, without departing from the embodiments herein, be performed in another order than the order in which they appear in the claims.

The invention claimed is:

1. A method in a near end radio link node for controlling power consumption in a radio link system in which the near end radio link node is connected to a far end radio link node via a radio link, the method comprising:

the near end radio link node obtaining a granted rate of traffic on the radio link between the near end radio link node and the far end radio link node;

the near end radio link node obtaining a demanded rate of the traffic on the radio link between the near end radio link node and the far end radio link node; and the near end radio link node controlling power consumption for the radio link system based on the granted rate of traffic and the demanded rate of traffic, wherein controlling the power consumption for the radio link system comprises:

the near end radio link node determining whether the demanded rate of traffic is less than the granted rate of traffic or whether the demanded rate of traffic is more than the granted rate of traffic;

in response to determining that the demanded rate of traffic is less than the granted rate of traffic, the near end radio link node reducing its output power; and in response to determining that the demanded rate of traffic is more than the granted rate of traffic, the near end radio link node increasing its output power.

2. The method according to claim 1, wherein obtaining the demanded rate comprises:

the near end radio link node obtaining an idle rate of the traffic on the radio link between the near end radio link node and the far end radio link node; and the near end radio link node obtaining a rejection rate of the traffic on the radio link between the near end radio link node and the far end radio link node;

and wherein the demanded rate is based on the granted rate, idle rate and rejection rate.

3. The method according to claim 2, wherein obtaining the demanded rate comprises calculating the demanded rate ($R_D$) as $R_G+R_R-R_I$, wherein $R_G$ is the granted rate of traffic, $R_R$ is the rejection rate of traffic, and $R_I$ is the idle rate of traffic.

4. The method according to claim 1, further comprising:
the near end radio link node obtaining a signal to noise ratio for traffic received at a far end radio link node receiver.

5. The method according to claim 4, wherein the controlling power consumption is further based on the signal to noise ratio.

6. The method according to claim 1, further comprising:
the near end radio link node controlling a modulation and coding rate of the traffic on the radio link between the near end radio link node and the far end radio link node.

7. The method according to claim 6, wherein the controlling modulation and coding rate is based on at least one of the signal to noise ratio, granted rate and demanded rate.

8. The method according to claim 1, wherein the method further comprising:
the near end radio link node changing a power state of a near end radio link node transmitter for one of at least two radio carriers in the radio link based on the demanded traffic rate.

9. The method according to claim 1, wherein the method further comprises:
the near end radio link node identifying a power state of a far end radio link node transmitter; and
the near end radio link node changing a power state of a near end radio link node receiver for one of at least two radio carriers in the radio link based on an identified on/off status of the far end radio link node transmitter.

10. The method according to claim 1, wherein both the granted rate of traffic and the demanded rate of traffic indicates a quantity of data per transmitted symbol or per unit of time.

11. The method according to claim 1, wherein controlling the power consumption for the radio link system further comprises:

the near end radio link node determining a modulation scheme or coding rate that corresponds to the demanded rate of traffic;

in response to determining that the demanded rate of traffic is less than the granted rate of traffic, selecting a modulation scheme or coding rate that is one level higher than the determined modulation scheme or coding rate for use in communicating with the far end radio link node.

12. The method according to claim 1, wherein controlling the power consumption for the radio link system comprises:

the near end radio link node determining a current modulation scheme or coding rate it is using to communicate with the far end radio link node;

in response to determining that the current modulation scheme or coding rate does not support the demanded rate of traffic, the near end radio link increasing its output power;

in response to determining that the demanded rate of traffic is lower than a maximum rate supported by the current modulation scheme or coding rate, the near end radio link decreasing its output power.

13. The method according to claim 12, wherein increasing the output power comprises the near end radio link node increasing the output power to a level that allows the near end radio link node to switch to a higher-level modulation scheme or coding rate than the current modulation scheme or coding rate, and wherein decreasing the output power comprises the near end radio link node switching to a lowest-level modulation scheme or coding rate that supports the demanded rate of traffic and decreasing the output power to a level that corresponds with the lowest-level modulation scheme or coding rate.

14. A near end radio link node for controlling power consumption in a radio link system, the near end radio link node being connected to a far end radio link node via a radio link, the near end radio link node comprising:

an obtaining unit configured to i) obtain a granted rate of traffic on the radio link between the near end radio link node and the far end radio link node and ii) obtain a demanded rate of the traffic on the radio link between the near end radio link node and the far end radio link node; and a controlling unit configured to control power consumption for the radio link system based on the granted rate of traffic and the demanded rate of traffic, wherein the controlling unit is configured to control the power consumption for the radio link system by:

determining whether the demanded rate of traffic is less than the granted rate of traffic or whether the demanded rate of traffic is more than the granted rate of traffic;

in response to determining that the demanded rate of traffic is less than the granted rate of traffic, reducing the near end radio link node's output power; and in response to determining that the demanded rate of traffic is more than the granted rate of traffic, increasing the near end radio link node's output power.

15. The near end radio link node according to claim 14, wherein the obtaining unit is further configured to:

obtain an idle rate of the traffic on the radio link between the near end radio link node and the far end radio link node; and obtain a rejection rate of the traffic on the radio link between the near end radio link node and the far end radio link node;

and wherein the demanded rate is based on the granted rate, idle rate and rejection rate.

16. The near end radio link node according to claim 14, wherein the obtaining unit is further configured to obtain a signal to noise ratio for traffic received at a far end radio link node receiver.

17. The near end radio link node according to claim 16, wherein the controlling power consumption is further based on the signal to noise ratio.

18. The near end radio link node according claim 14, wherein the controlling unit is further configured to control a modulation and coding rate of the traffic on the radio link) between the near end radio link node and the far end radio link node.

19. The near end radio link node according to claim 18, wherein the controlling modulation and coding rate is based on at least one of the signal to noise ratio, granted rate and demanded rate.

20. The near end radio link node according to claim 14, further comprising:
a changing unit configured to change a power state of a near end radio link node transmitter for one of at least two radio carriers in the radio link based on the demanded traffic rate.

21. The near end radio link node according to claim 14, further comprising:
an identifying unit configured to identify a power state of a far end radio link node transmitter; and wherein the changing unit is further configured to change a power state of a near end radio link node receiver for one of at least two radio carriers in the radio link based on an identified on/off status of the far end radio link node transmitter.

\* \* \* \* \*

UNITED STATES PATENT AND TRADEMARK OFFICE
CERTIFICATE OF CORRECTION

PATENT NO. : 9,282,508 B2  
APPLICATION NO. : 13/977334  
DATED : March 8, 2016  
INVENTOR(S) : Thorsen et al.

Page 1 of 1

It is certified that error appears in the above-identified patent and that said Letters Patent is hereby corrected as shown below:

In the specification,

In Column 6, Line 30, delete "then" and insert -- than --, therefor.

In Column 7, Line 67, delete "then" and insert -- than --, therefor.

In Column 8, Line 4, delete "then" and insert -- than --, therefor.

In Column 10, Line 1, delete "then" and insert -- than --, therefor.

Signed and Sealed this  
Twenty-eighth Day of June, 2016

Michelle K. Lee  
*Director of the United States Patent and Trademark Office*